3,120,557
PENTAHALOPHENYL CARBONATES

Raymond E. Stenseth, Webster Groves, and Joseph W. Baker, Kirkwood, Mo., assignors to Monsanto Chemical Company, St. Louis, Mo., a corporation of Delaware
No Drawing. Filed May 18, 1962, Ser. No. 195,985
10 Claims. (Cl. 260—463)

This invention relates to a novel class of phenyl chloroformate derivatives. More particularly, this invention is concerned with a class of new organic compounds which are pentahalophenyl phenyl or halophenyl carbonates. Such carbonates are found to possess useful and unexpected biological activity.

The novel compounds of this invention have the general formula

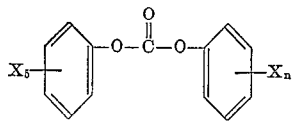

where X is selected from a group consisting of chlorine and bromine, and $n$ is an integer from 0 to 3.

This class of compounds can be prepared by causing pentahalophenol to react with phenyl chloroformate or a halophenyl chloroformate to produce the desired pentahalophenyl phenyl or halophenyl carbonate. In such reactions, it is preferred to add a tertiary amine to the reaction mixture to serve as an acceptor for the hydrogen chloride formed during the reaction. Examples of tertiary amines which can be used are quinaldine, triethylamine, dimethylaniline, diethylaniline, pyridine, and the like. Examples of reactions utilizing an amine acceptor yielding pentahalophenyl phenyl or halophenyl carbonate are as follows:

(a)
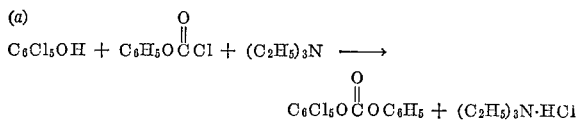

(b)
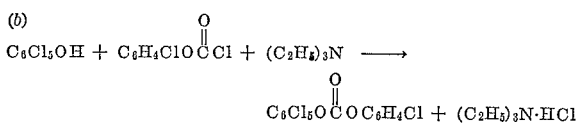

(c)
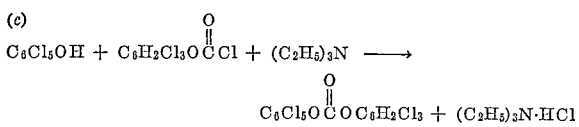

In practicing the preparations of Equations $a$, $b$ or $c$, it is also preferred to use an inert organic solvent for the chloroformate. Among the suitable solvents are benzene, toluene, xylene, hexane, heptane, octane, propyl ether, ethyl ether, tetrahydrofuran, dioxane, and the like. The reaction temperatures employed in preparing the new compounds will depend upon the particular reactants utilized to obtain a desired end product.

It should be noted that, although both are preferred, neither the tertiary amine nor the inert organic solvent are essential to the preparation of the compounds of this invention. In absence of such amine, the hydrogen chloride which forms during the reaction can be boiled off.

The invention will be more fully understood by reference to the following examples which are set forth herein solely for the purpose of illustration and are not to be construed as limiting the scope of the present invention.

Example I

A suitable reaction vessel is charged with 26.6 grams (0.1 mole) of pentachlorophenol dissolved in 175 ml. of toluene, to which is added 15.7 grams (0.1 mole) of phenyl chloroformate, with stirring. A solution of 10.1 grams (0.1 mole) of triethylamine in 25 ml. toluene is added dropwise, with stirring, over a period of about 20 minutes causing a temperature rise from 30° C. to 50° C. during the addition of the amine. The mixture is heated and stirred at 110° C. for six hours. The reaction mixture is cooled, and the amine hydrochloride which forms is filtered off and washed with toluene. The filtrate and the combined washings are evaporated to remove the toluene leaving a light grey solid. Recrystallization from methylcyclohexane with activated charcoal yields 31.3 grams of pentachlorophenyl phenylcarbonate as white crystals, M.P. 107–108° C. (Fisher-Johns melting point apparatus). Analysis shows 45.7% chlorine as against a calculated value of 45.9% for $C_{13}H_5Cl_5O_3$.

Example II

A suitable reaction vessel is charged with 9.5 grams (0.05 mole) of p-chlorophenyl chloroformate, 13.3 grams (0.05 mole) of pentachlorophenol and 300 ml. of ether. The mixture is cooled to 5° C., and 5.1 grams (0.05 mole) of triethylamine dissolved in 15 ml. ether is added dropwise, with stirring, over a period of about 15 minutes while the temperature is maintained between 5–10° C. The mixture is then refluxed for four hours. The reaction mixture is cooled, and the solids which form are filtered and washed with ether. The solid material is treated with water to separate the carbonate from the amine hydrochloride. Concentration of the ether solution yielded additional carbonate. The combined total quantitative yield is 14.3 grams. Recrystallization from methylcyclohexane containing activated charcoal gives p-chlorophenyl pentachlorophenyl carbonate as white crystals, M.P. 124–125° C. (Fisher-Johns melting point apparatus). Analysis shows 50.6% chlorine as against 50.5% calculated for $C_{13}H_4Cl_6O_3$.

Example III

In a suitable reaction vessel, 48.9 grams (0.1 mole) of pentabromophenol is reacted with 31.4 grams (0.1 mole) of 2,4-dibromophenyl chloroformate according to the procedure set forth in Example II. There is obtained 2,4-dibromophenyl pentabromophenyl carbonate in good yield.

Example IV

A suitable reaction vessel is charged with 6.7 grams (0.025 mole) of pentachlorophenol, 2.5 grams (0.025 mole) of triethylamine, and 300 ml. of ether. The solution is cooled to 3° C. and stirred during the dropwise addition of 6.5 grams (0.025 mole) 2,4,5-trichlorophenyl chloroformate dissolved in 150 ml. of ether over a period of one hour. The resulting mixture is stirred for three hours at room temperature. The reaction mixture is permitted to stand overnight and thereafter filtered, washed with ether, and dried. The dried residue is stirred with water, refiltered and dried yielding a white solid of impure pentachlorophenyl 2,4,5-trichlorophenyl carbonate. The impure white solid is dissolved in methylcyclohexane and recrystallized yielding 10.2 grams of pentachlorophenyl 2,4,5-trichlorophenyl carbonate as white crystals, which show a M.P. of 188–189° C. with Fisher-Johns melting point apparatus. Analysis shows 57.7% chlorine against 57.9% calculated for $C_{13}H_2Cl_8O_3$.

Example V

In a suitable reaction vessel, 39.3 grams (0.1 mole) of 2,4,6-tribromophenyl chloroformate is reacted with 48.9 grams (0.1 mole) of pentabromophenol according to the procedure set forth in Example II. There is obtained pentabromophenyl 2,4,6-tribromophenyl carbonate in good yield.

*Example VI*

In a suitable reaction vessel 23.5 grams (0.1 mole) of o-bromophenyl chloroformate is reacted with 48.9 grams (0.1 mole) pentabromophenol according to the procedure set forth in Example II. There is obtained o-bromophenyl pentabromophenyl carbonate in good yield.

*Example VII*

In a suitable reaction vessel 7.8 grams (0.05 mole) of phenyl chloroformate is reacted with 24.4 grams (0.05 mole) of pentabromophenol according to the procedure set forth in Example I. There is obtained pentabromophenyl phenyl carbonate in good yield.

The products of the present invention are useful as microbiocides adapted to be employed for the control of bacterial and fungal organisms. In a representative test, pentachlorophenyl phenyl carbonate is active against *Staphylococcus aureus* at a dilution in excess of one part per million.

While this invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A compound of the formula

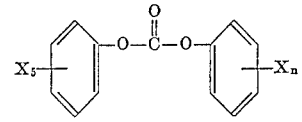

where X is selected from a group consisting of chlorine and bromine, and $n$ is an integer from 0 to 3.
2. Pentachlorophenyl phenyl carbonate.
3. p-Chlorophenyl pentachlorophenyl carbonate.
4. 2,4-dichlorophenyl pentachlorophenyl carbonate.
5. Pentachlorophenyl 2,4,5-trichlorophenyl carbonate.
6. Pentabromophenyl phenyl carbonate.
7. o-Bromophenyl pentabromophenyl carbonate.
8. m-Bromophenyl pentabromophenyl carbonate.
9. 2,4-dibromophenyl pentabromophenyl carbonate.
10. Pentabromophenyl 2,4,6-tribromophenyl carbonate.

References Cited in the file of this patent
UNITED STATES PATENTS 2,430,017    Houk _____ Nov. 4, 1947

FOREIGN PATENTS 753,766    Great Britain _____ Aug. 1, 1956